US012798887B2

(12) United States Patent
Mohan

(10) Patent No.: US 12,798,887 B2
(45) Date of Patent: Nov. 17, 2026

(54) ADAPTOR FOR MOUNTING COMPONENTS TO A CONVEYOR FRAME

(71) Applicant: Laitram, L.L.C., Harahan, LA (US)

(72) Inventor: Jake A. Mohan, Grand Rapids, MI (US)

(73) Assignee: Laitram, L.L.C., Harahan, LA (US)

( * ) Notice: Subject to any disclaimer, the term of this patent is extended or adjusted under 35 U.S.C. 154(b) by 228 days.

(21) Appl. No.: 18/712,055

(22) PCT Filed: Nov. 30, 2022

(86) PCT No.: PCT/US2022/051328
§ 371 (c)(1),
(2) Date: May 21, 2024

(87) PCT Pub. No.: WO2023/102004
PCT Pub. Date: Jun. 8, 2023

(65) Prior Publication Data

US 2025/0270051 A1 Aug. 28, 2025

Related U.S. Application Data

(60) Provisional application No. 63/285,157, filed on Dec. 2, 2021.

(51) Int. Cl.

| | |
|---|---|
| ***B65G 39/12*** | (2006.01) |
| ***B65G 21/10*** | (2006.01) |
| ***B65G 23/22*** | (2006.01) |
| ***B65G 45/12*** | (2006.01) |

(52) U.S. Cl.
CPC ............. *B65G 39/12* (2013.01); *B65G 21/10* (2013.01); *B65G 23/22* (2013.01); *B65G 45/12* (2013.01)

(58) Field of Classification Search
None
See application file for complete search history.

(56) References Cited

U.S. PATENT DOCUMENTS

| | | | | |
|---|---|---|---|---|
| 2002/0074215 A1 | 6/2002 | Klabisch et al. | | |
| 2016/0311622 A1* | 10/2016 | DeGroot | ................ | B65G 21/06 |
| 2017/0362040 A1 | 12/2017 | Wetters et al. | | |

(Continued)

FOREIGN PATENT DOCUMENTS

| | | | |
|---|---|---|---|
| DE | 102020131558 B3 * | 11/2021 | ............. B65G 45/12 |
| EP | 3109186 A1 * | 12/2016 | ............. B65G 39/12 |

(Continued)

OTHER PUBLICATIONS

Extended European Search Report, European Patent Application No. 22902104.3, mailed Feb. 11, 2026, European Patent Office, Munich, Germany.

(Continued)

*Primary Examiner* — Gene O Crawford
*Assistant Examiner* — Muhammad Awais
(74) *Attorney, Agent, or Firm* — Catherine M. Bishop

(57) ABSTRACT

An adaptor for mounting components to a drive assembly for a conveyor belt comprises a shaped body having a bearing opening, fastener openings for fastening the shaped body to an outside surface of an end plate of the drive assembly and openings for mounting an auxiliary conveyor component to the adaptor to place the auxiliary conveyor component relative to the conveyor belt.

13 Claims, 4 Drawing Sheets

(56) References Cited

U.S. PATENT DOCUMENTS

| | | | | |
|---|---|---|---|---|
| 2019/0263596 | A1* | 8/2019 | DeGroot | B65G 23/44 |
| 2021/0009354 | A1* | 1/2021 | DeGroot | B65G 21/06 |
| 2021/0347579 | A1* | 11/2021 | Boire | B65G 39/12 |
| 2022/0250854 | A1* | 8/2022 | DeGroot | B65G 45/16 |

FOREIGN PATENT DOCUMENTS

| | | | | |
|---|---|---|---|---|
| JP | 2001019132 | A * | 1/2001 | |
| WO | WO-2018111743 | A1 * | 6/2018 | B65G 39/12 |
| WO | WO-2020227209 | A1 * | 11/2020 | B65G 21/2072 |
| WO | WO-2020236715 | A1 * | 11/2020 | B65G 45/22 |

OTHER PUBLICATIONS

Anonymous: “Sand Car Hub Flanges, Trailing Arm Flanges”, Aug. 4, 2021 (Aug. 4, 2021), XP093357776, Retrieved from the Internet: URL: https: //web.archive.org/web/20210804210422 / https:// www.tabzone.com / 12051-01-Stub-Axle-Hub-Flange-- 8 - Hole_p_366.html (retrieved on Jan. 26, 2026) *the whole document *.

* cited by examiner

ADAPTOR FOR MOUNTING COMPONENTS TO A CONVEYOR FRAME

RELATED APPLICATIONS

The present application claims priority to U.S. Provisional Patent Application No. 63/285,157 filed Dec. 2, 2021 and entitled "Adaptor for Mounting Components to a Conveyor Frame", the contents of which are herein incorporated by reference.

FIELD OF THE INVENTION

The present invention relates to power-driven conveyors. More particularly, the invention relates to drive assemblies for moving a conveyor belt through a circuit and transitioning conveyed items off of the conveyor belt.

BACKGROUND OF THE INVENTION

Power-driven conveyors that move through a circuit having a carryway and returnway below the carryway are used to convey items. Infeed assemblies are used to transition items onto a conveyor belt as the conveyor belt moves from the returnway to the carryway. Outfeed assemblies are used to transition items off of the conveyor belt as the belt moves from the carryway to the returnway. A drive moves the conveyor belt through the conveying circuit. For example, drive sprockets mounted on a rotatable shaft may engage and drive the conveyor belt along the conveying circuit. Drive sprockets can be located at the outfeed of the conveyor or within the returnway of the conveying circuit. Scrapers can be mounted at the outfeed to remove debris from the conveyor belt before it enters the returnway. Hygiene can pose a problem with conveyors, as dirt, debris, bacteria and other contaminants can become trapped in the different components.

SUMMARY OF THE INVENTION

A shaped adaptor plate mounts auxiliary conveyor components to standard end plates in a conveyor frame. The adaptor plate comprises a shaped body having a bearing opening, fastener openings for fastening the shaped body to an outside surface of an end plate of the conveyor frame and openings for mounting an auxiliary conveyor component to the adaptor plate to place the auxiliary conveyor component relative to the conveyor belt.

According to one aspect, an adaptor for mounting a conveyor component to a drive assembly for a conveyor belt is provided. The drive assembly comprising spaced-apart end plates. The adaptor has a shaped body forming a bearing opening for seating a bearing for rotatably housing a drive shaft mounted to the end plates, a plurality of fastening openings distributed about the periphery of the bearing opening for receiving fasteners to mount the adaptor to an end plate, at least one mounting opening formed in a bottom portion of the adaptor for mounting a conveyor component and at least one pin hole for receiving an alignment pin in the conveyor component to ensure proper alignment of the conveyor component with the adaptor.

According to another aspect, a conveyor assembly, comprises a first end plate adjacent to an end of a conveyor, a second end plate opposing the first end plate and an auxiliary conveyor assembly mounted to and between the first end plate and second end plate using a first adaptor plate mounted to the first end plate and a second adaptor plate mounted to the second end plate. Each adaptor plate comprises a shaped body forming a bearing opening for seating a bearing for rotatably housing a drive shaft mounted to the end plates a plurality of fastening openings distributed about the periphery of the bearing opening for receiving fasteners to mount the adaptor to an end plate and first and second mounting openings for mounting a conveyor component.

According to another aspect, a method of integrating an auxiliary conveyor component to a drive end of a conveyor comprises the steps of mounting a first adaptor to a first end plate at the drive end, aligning the auxiliary conveyor component with the first adaptor by inserting alignment pins extending from the auxiliary conveyor component into alignment holes in the adaptor, such that fastener openings in the auxiliary conveyor component align with mounting openings of the adaptor and inserting fasteners through the fastener openings and into the mounting openings to mount the auxiliary conveyor component relative to the first end plate.

DETAILED DESCRIPTION OF THE INVENTION

The present invention provides a sanitary system at a drive end of a conveyor that can be easily configured, reconfigured, installed, moved to a cleaning position, and—or removed. The present invention will be described below relative to an illustrative embodiment. Those skilled in the art will appreciate that the present invention may be implemented in a number of different applications and embodiments and is not specifically limited in its application to the particular embodiments depicted herein.

Figure 1:
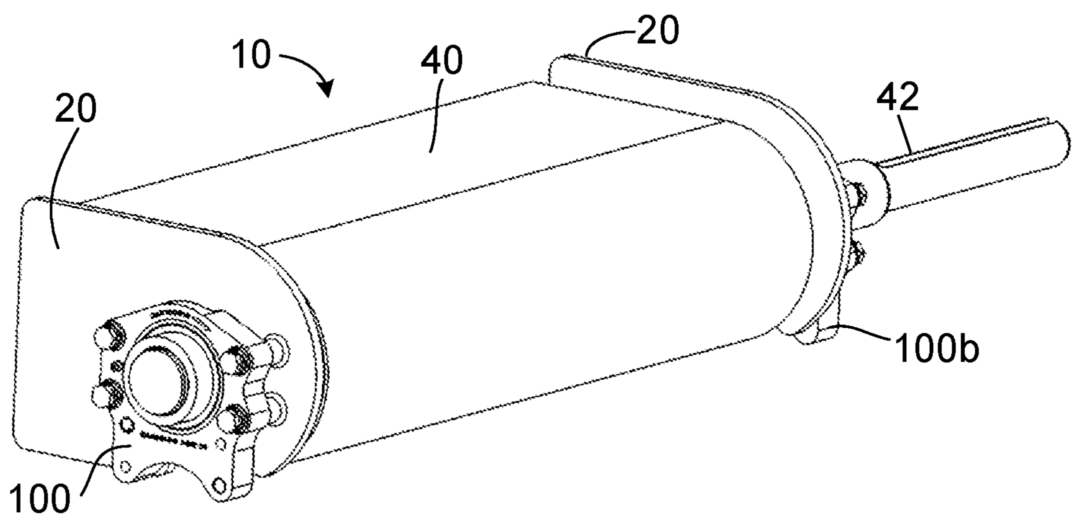
FIG. 1 is an isometric view of a drive assembly for a conveyor including an adaptor according to an embodiment of the invention.

FIG. 1 is an isometric view of a drive assembly 10 for a conveyor forming an outfeed for a conveyor. The drive assembly 10 comprises a pair of opposing end plates 20 for mounting a drive shaft 42 of a reversing element, such as a sprocket or other conveyor drive, for a conveyor belt 40 at outfeed end of a carryway, which extends between the pair of end plates 20. The illustrative conveyor belt 40 is a positive drive, low tension conveyor belt. Examples of suitable positively-driven, low tension conveyor belts include, but are not limited to: THERMODRIVE® belting, available from Intralox, LLC, of Harahan, LA, USA, the Cleandrive belt available from Habasit AG, the Gates Mectrol PosiClean® belt available from Gates Mectrol, the Volta SuperDrive™ belt and other positive drive belts available from Volta Belting and other positively-driven, low tension conveyor belts known in the art. The illustrative conveyor belt 40 has a smooth outer surface substantially free of discontinuities and an inner surface with a plurality of teeth at a given belt pitch or other suitable drive elements. The conveyor belt 40 conveys products along the carryway from an infeed to the outfeed and returns along a returnway below the carryway. The conveyor belt 40 may include flights or other features and is not limited to the illustrative examples. The end plates 20 also each mount an adaptor plate 100 for integrating additional auxiliary conveyor components, such as, but not limited to, a position limiter, scraper and other components, to the conveyor. The adaptor plate 100 precisely places the conveyor components relative to the end plate 20 and conveyor belt 40.

Figure 2:
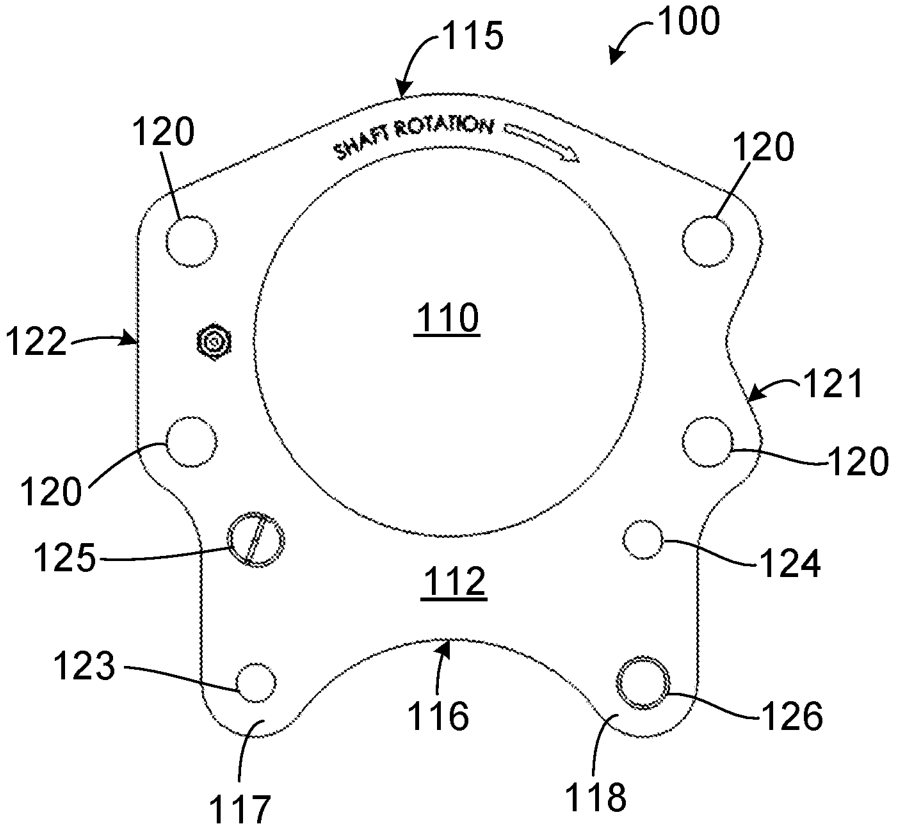
FIG. 2 is a front view of the adaptor of FIG. 1.
Figure 3:
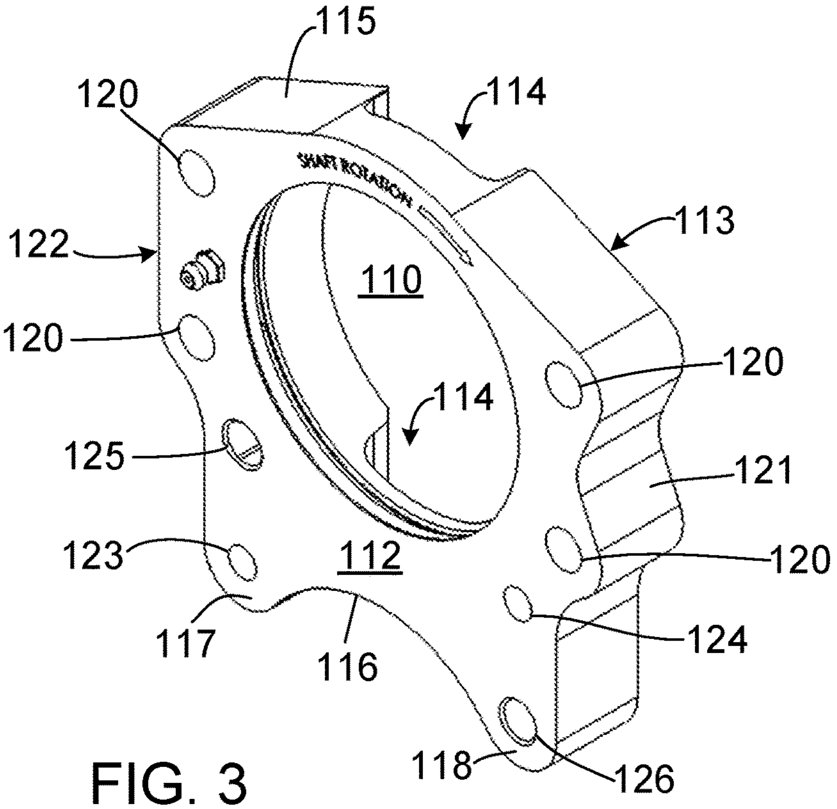
FIG. 3 is an isometric view of the adaptor of FIG. 2.

The illustrative adaptor plate 100 may be mounted outside an associated end plate 20. A second adaptor end plate **100*b* is mounted to and outside the opposite end plate. As shown in FIGS. 2 and 3, the illustrative adaptor plate 100 comprises a shaped body forming a bearing opening 110 for seating a bearing for rotatably housing the drive shaft 42. The bearing opening 110 may be configured to seat a spherical bearing. The adaptor plate 100 includes a planar outer surface 112 and an inner surface 113 of the adaptor plate configured to sit against an outside surface of the respective end plate 20. The illustrative inner surface includes a vertical channel 114 intersecting the bearing opening 110 and open to a top edge 115 and a bottom edge 116 of the adaptor plate 100. The adaptor 100 further includes a shaped outer edge 121 and a shaped inner edge 122**.

The illustrative top edge 115 is convexly curved, following the curve of the bearing opening 110, but the invention is not so limited.

The bottom edge 116 may be shaped to form a central concave curve 116 and opposing tabs 117, 118 on each side of the central concave curve 116, but alternative shapes may be used.

The illustrative adaptor 100 further includes fastening openings 120 distributed about the periphery of the bearing opening 110 for receiving fasteners, such as bolts, to mount the adaptor 100 to an end plate 20. The fastening openings 120 extend through the shaped body.

Diagonally opposing mounting openings 123, 124 are formed in a bottom portion of the adaptor 100 for mounting a conveyor component. The illustrative mounting openings 123, 124 are tapped, but the invention is not so limited. An inner tapped mounting opening 123 is formed in a lower tab 117. An outer tapped mounting opening 124 is formed near the shaped outer edge 121 and aligns with the bottom of the bearing opening, but the invention is not so limited. Each tapped mounting opening 123, 124 receives a fastener extending through a conveyor component to mount the conveyor component to the adaptor 100 and the attached end plate 20. Alternatively, the mounting openings 123, 124 can be blind, as opposed to tapped, or otherwise configured to suitably mount a conveyor component to the adaptor 100.

The illustrative adaptor 100 further includes diagonally opposing pin holes 125, 126 for receiving alignment pins in the conveyor component to ensure proper alignment of the conveyor component with the adaptor 100. The outer pin hole 126 is formed in an outer lower tab 118, aligned with the inner mounting opening 123. The inner pin hole 125 aligns laterally and vertically with the mounting openings 123, 124 and is formed near the inner shaped edge 122. The pin holes 125, 126 can have any suitable size and shape, such as circular, oval or a slot and are not limited to the illustrative embodiment.

The mounting openings 123, 124, and pin holes 125, 126 are not limited to the illustrative diagonally opposing, alternating configuration, and any suitable arrangement may be used to mount and align an auxiliary conveyor component to the adaptor 100.

Figure 4:
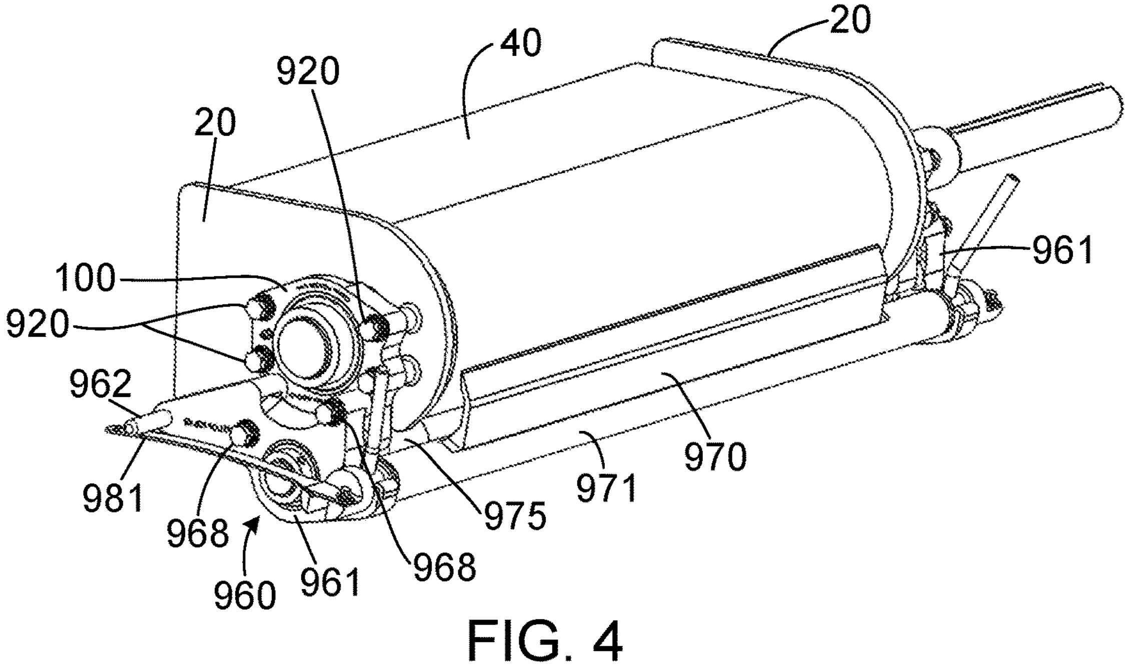
FIG. 4 is an isometric view of a drive assembly with an adaptor used to integrate a roller position limiter-scraper assembly according to an embodiment.

The adaptor 100 may be used to integrate any suitable conveyor component to a conveyor comprising standard end plates. For example, as shown in FIG. 4, a set of adaptors 100 may mount a roller limiter scraper assembly 960 to end plates 20. A suitable roller limiter scraper assembly 960 is described in published PCT Patent Application Number PCT/US2020/033406 (WO2020/236715), filed May 18, 2020, and entitled "Drive Assembly for a Conveyor", the contents of which are herein incorporated by reference. The illustrative roller limiter scraper assembly 960 comprises a pair of limiter mounting plates 961, each mounted to an adaptor 100. The adaptors 100 are mounted to end plates 20 using fasteners 920 inserted in the fastening openings 120. The limiter mounting plates 961 are mounted to the adaptors using fasteners 968 inserted through corresponding openings in the limiter mounting plates 961 and through the mounting openings 123, 124 in the adaptors 100. Alignment pins (not shown) extending from the inner surfaces of the roller limiter mounting plates 961 may be inserted in the alignment holes 125, 126 of the adaptors to facilitate alignment and mounting. The roller limiter scraper assembly further comprises a scraper blade 970 extending from a scraper base 971 that is seated in seats formed in the limiter mounting plates 961. A leaf spring 981 or other biasing element interacts with a stop 962 on the limiter mounting plate 960 to bias the scraper blade 970 into contact with a conveyor belt reversing around the end plates 20. A roller limiter 975 extends between the limiter mounting plates 961 and is mounted at its end using bearings inserted in the limiter mounting plates 961 or other suitable mounting means. The adaptors 100 precisely position the components of the roller limiter scraper assembly 960 relative to the conveyor belt 40 and end plates 20 and facilitate integration and removal of the roller limiter scraper assembly 960 if necessary.

Figure 5:
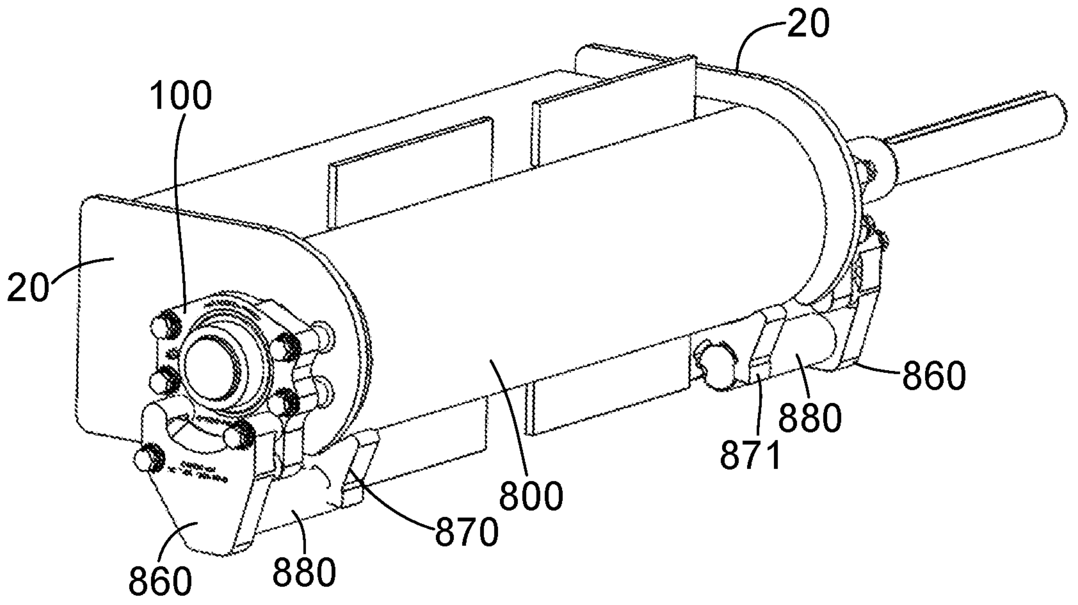
FIG. 5 is an isometric view of a drive assembly with an adaptor used to integrate a position limiter assembly accommodating flights on a conveyor belt according to another embodiment.

As shown in FIG. 5, a set of adaptors 100 may be used to mount position limiter mounting plates 860 that extend below conveyor frame end plates 20 for mounting snap-on position limiters 870 on an integrated mounting bar 880, as also described in published PCT Patent Application Number PCT/US2020/033406 (WO2020/236715). The mounting bar 880 extends inwards from the associated position limiter mounting plate 860 and places a position limiter 870 into position relative to a conveyor belt 800 reversing around the end plates 20. The position limiter mounting plates 860 can be mounted to the adaptors 100 and thus easily integrated into the conveyor frame using fasteners and alignment pins, as described above.

Figure 6:
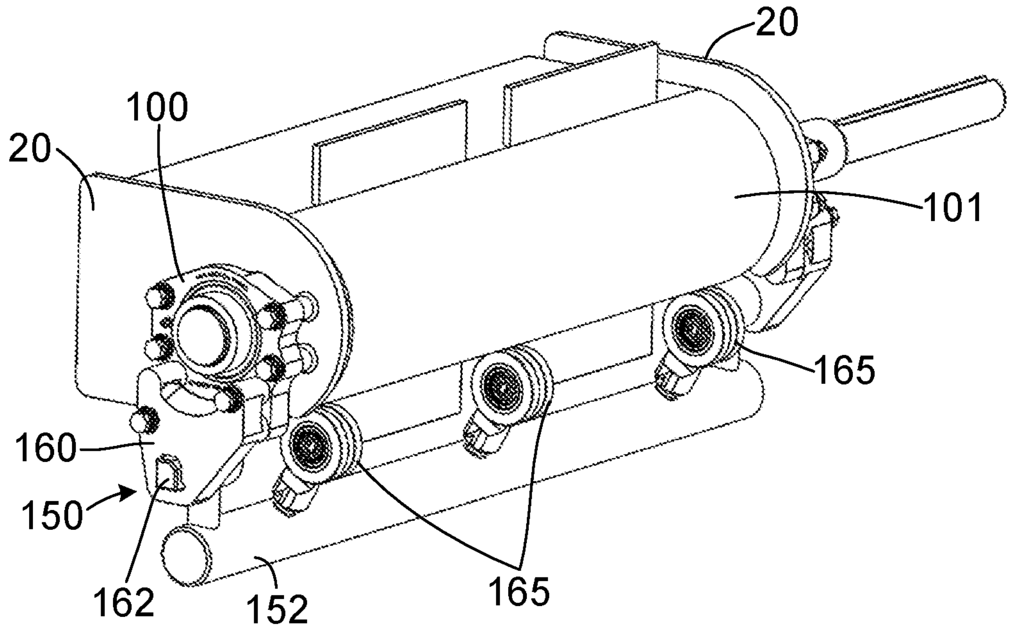
FIG. 6 is an isometric view of a drive assembly with an adaptor used to integrate a position limiter assembly with rollers according to another embodiment.

As shown in FIG. 6, a set of adaptors 100 may be used to mount a roller position limiter assembly 150 comprising a mounting bar 152 extending between mounting plates 162 and mounting a plurality of rollers 165 for controlling the engagement of the conveyor belt with a drive, such as a sprocket. The mounting bar 152 is positioned below the mounting plates 160 and fastened thereto using fasteners 162 or other suitable mounting means. Each mounting plate 160 is mounted to an adaptor 100, which is mounted to a conveyor end plate 20, as described above. The adaptors 100 precisely position the rollers 165 relative to a conveyor belt 101 moving around the end plates 20. A suitable roller position assembly is described in published PCT Patent Application Number PCT/US2019/023345 (WO2019/

183337), entitled Position Limiter for Flighted Conveyor Belt, filed Mar. 21, 2019, the contents of which are herein incorporated by reference.

Figure 7:
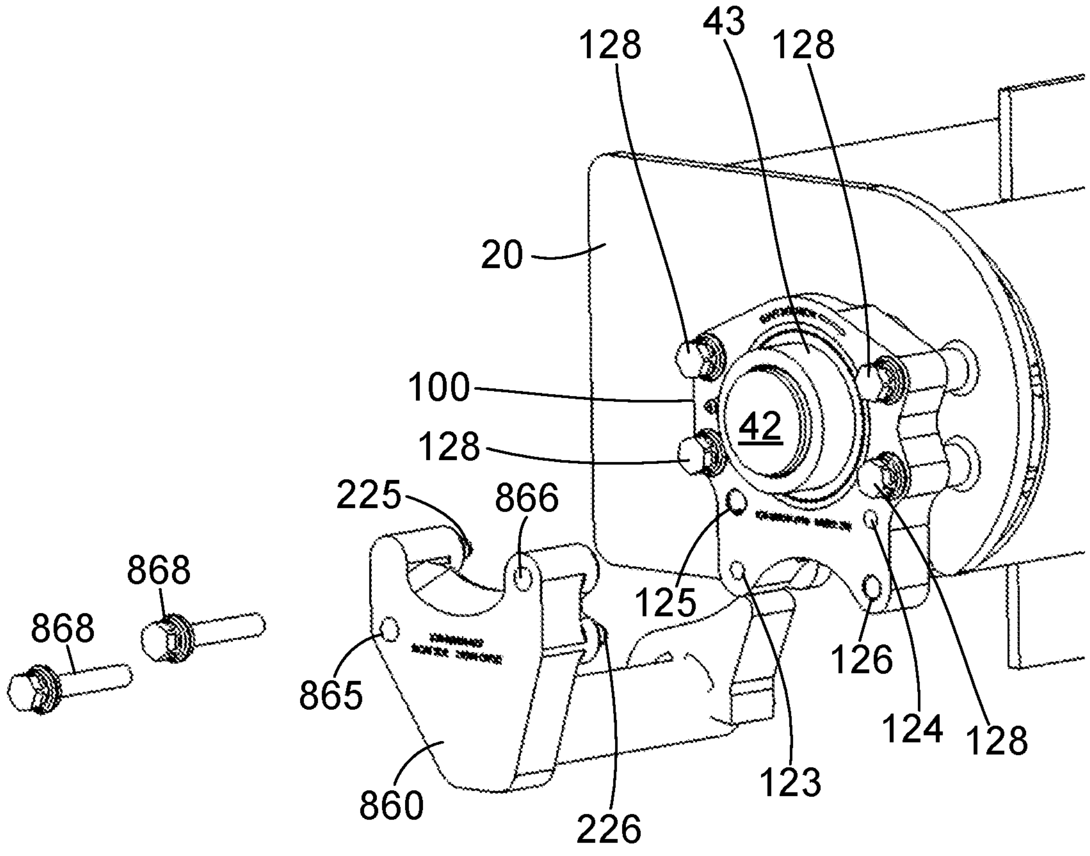
FIG. 7 is a detailed view of a side of a drive assembly during mounting of an adaptor and conveyor component according to another embodiment.

As shown in FIG. 7, to integrate a conveyor component, such as a position limiter mounting plate 860, to a drive end 10 of a conveyor comprising end plates 20, an adaptor 100 is first mounted to the outside of an end plate 20 using fasteners 128 inserted through fastener openings 120 and into corresponding openings formed in the end plate 20. In this position, the bearing opening of the adaptor seats a bearing 43 rotatably housing a drive shaft 42.

Then, the conveyor component is aligned with the adaptor 100 by inserting alignment pins 225, 226 extending from the conveyor component into the alignment holes 125, 126 in the adaptor 100, such that fastener openings 865, 866 in the conveyor component align with the mounting openings 123, 124 of the adaptor 100. Finally, fasteners 868 are inserted through the openings 865, 866 and into the mounting openings 123, 124 to mount the conveyor component 860 relative to the end plate 20 in a precise position optimal for operation. The conveyor component can be easily removed and replaced, if desired.

Other suitable auxiliary conveyor components may be integrated to a conveyor using the illustrative adaptor plates, and the invention is not limited to scrapers, rollers and position limiters.

The scope of the claims is not meant to be limited to the details of the described exemplary embodiments.

What is claimed is:

1. An adaptor for mounting a conveyor component to a drive assembly for a conveyor belt, the drive assembly comprising spaced-apart end plates, comprising:
- a shaped body forming a bearing opening for seating a bearing for rotatably housing a drive shaft mounted to the end plates, the shaped body having a bottom edge shaped to form a central concave curve, a first tab on a first side of the central concave curve and a second tab on a second side of the central concave curve;
- a plurality of fastening openings distributed about the periphery of the bearing opening for receiving fasteners to mount the adaptor to an end plate;
- a first mounting opening formed in the first tab for mounting a conveyor component;
- a second mounting opening diagonally opposing the first mounting opening and aligned with the bottom of the bearing opening;
- a first pin hole formed in the second tab, aligned vertically with the first mounting opening, for receiving a first alignment pin extending from the conveyor component to ensure proper alignment of the conveyor component with the adaptor; and
- a second pin hole diagonally opposing the first pin hole and aligned vertically with the second mounting opening and laterally with the first mounting opening for receiving a second alignment pin extending from the conveyor component.

2. The adaptor of claim 1, wherein the shaped body comprises:
- a planar outer surface;
- an inner surface configured to sit against an end plate;
- a shaped outer edge;
- a shaped inner edge; and
- a convexly curved top edge.

3. The adaptor of claim 2, wherein the top edge follows the curve of the bearing opening.

4. The adaptor of claim 2, wherein the inner surface includes a vertical channel intersecting the bearing opening and open to the top edge and the bottom edge.

5. The adaptor of claim 1, wherein the first and second diagonally opposing mounting openings are tapped.

6. A conveyor assembly, comprising:
- a first end plate adjacent to an end of a conveyor;
- a second end plate opposing the first end plate; and
- an auxiliary conveyor assembly mounted to and between the first end plate and second end plate using a first adaptor plate mounted to the first end plate and a second adaptor plate mounted to the second end plate, the auxiliary conveyor assembly including first and second mounting plates each including diagonally opposing alignment pins extending inwards towards an associated end plate and diagonally opposing fastener openings, wherein each adaptor plate comprises
- a shaped body forming a bearing opening for seating a bearing for rotatably housing a drive shaft mounted to the end plates, the shaped body having a bottom edge shaped to form a central concave curve, a first tab on a first side of the central concave curve and a second tab on a second side of the central concave curve,
- a plurality of fastening openings distributed about the periphery of the bearing opening for receiving fasteners to mount the adaptor to an end plate;
- a first mounting opening formed in the first tab and configured to align with a first fastener opening in the auxiliary component assembly;
- a second mounting opening diagonally opposing the first mounting opening and configured to align with a second fastener opening in the auxiliary component assembly;
- a first pin hole formed in the second tab for receiving a first alignment pin extending from the first mounting plate; and
- a second pin hole diagonally opposing the first pin hole for receiving a second alignment pin extending from the first mounting plate.

7. The conveyor assembly of claim 6, wherein the adaptor plate further comprises:
- a planar outer surface;
- an inner surface configured to sit against an end plate;
- a shaped outer edge;
- a shaped inner edge; and
- a convexly curved top edge.

8. The conveyor assembly of claim 6, wherein the auxiliary conveyor component comprises a roller limiter scraper assembly.

9. The conveyor assembly of claim 6, wherein the auxiliary conveyor component comprises a first snap-on position limiter mounted on a first shaft extending from a first position limiter mounting plate mounted to the first adaptor plate.

10. The conveyor assembly of claim 9, further comprising a second snap-on position limiter mounted on a second shaft extending from a second position limiter mounting plate mounted to the second adaptor plate.

11. The conveyor assembly of claim 6, wherein the auxiliary conveyor component comprises a roller position limiter assembly comprising:
- a mounting bar extending between the first and second mounting plates; and a plurality of rollers for controlling the engagement of the conveyor belt with a drive extending from the mounting bar.

12. A method of integrating an auxiliary conveyor component to a drive end of a conveyor, comprising the steps of:

mounting a first adaptor to a first end plate at the drive end using fasteners, the first adaptor including a shaped body having a bearing opening, a bottom edge shaped to form a central concave curve, a first tab on a first side of the central concave curve, the first tab having a first mounting opening, a second mounting opening diagonally opposing the first mounting opening and aligned with the bottom of the bearing opening, the first adaptor further including a second tab on a second side of the central concave curve, the second tab having a first alignment hole, and further comprising a second alignment hole diagonally opposing the first alignment hole;

aligning the auxiliary conveyor component with the first adaptor by inserting first and second alignment pins extending from the auxiliary conveyor component into the first and second alignment holes in the adaptor, such that fastener openings in the auxiliary conveyor component align with the first and second mounting openings of the adaptor; and inserting fasteners through the fastener openings and into the mounting openings to mount the auxiliary conveyor component relative to the first end plate.

13. The method of claim 12, further comprising the steps of:

mounting a second adaptor to a second end plate opposing the first end plate; and aligning the auxiliary conveyor component with the second adaptor by inserting alignment pins extending from the auxiliary conveyor component into alignment holes in the second adaptor, such that fastener openings in the auxiliary conveyor component align with mounting openings of the second adaptor; and inserting fasteners through the fastener openings and into the mounting openings to mount the auxiliary conveyor component relative to the second end plate.

* * * * *